(12) United States Patent
Roberfroid et al.

(10) Patent No.: US 10,514,260 B2
(45) Date of Patent: Dec. 24, 2019

(54) INTEGRITY CONTROL METHOD AND MERGING/CONSOLIDATION DEVICE COMPRISING A PLURALITY OF PROCESSING MODULES

(71) Applicant: SAGEM DEFENSE SECURITE, Boulogne-Billancourt (FR)

(72) Inventors: David Roberfroid, Boulogne-Billancourt (FR); Jean-Luc Demange, Boulogne-Billancourt (FR); Michel Destelle, Boulogne-Billancourt (FR); Yves Becheret, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 126 days.

(21) Appl. No.: 15/795,173

(22) Filed: Oct. 26, 2017

(65) Prior Publication Data

US 2018/0128617 A1 May 10, 2018

Related U.S. Application Data

(63) Continuation of application No. 14/785,295, filed on Oct. 16, 2015, now abandoned.

(51) Int. Cl.
*G01S 19/42* (2010.01)
*G05B 9/03* (2006.01)
(Continued)

(52) U.S. Cl.
CPC ......... *G01C 21/005* (2013.01); *G01C 21/165* (2013.01); *G01S 19/42* (2013.01); *G05B 9/03* (2013.01)

(58) Field of Classification Search
CPC ..... G01C 21/005; G01C 21/165; G01S 19/20; G01S 19/42; G05B 9/03
(Continued)

(56) References Cited

U.S. PATENT DOCUMENTS

2012/0004846 A1   1/2012   Coatantiec et al.

FOREIGN PATENT DOCUMENTS

FR   2939900   6/2010

OTHER PUBLICATIONS

International Search Report and Written Opinion with English Language Translation, dated Jul. 16, 2014, Application No. PCT/EP2014/057996.
(Continued)

*Primary Examiner* — Brian P Sweeney
(74) *Attorney, Agent, or Firm* — Womble Bond Dickinson (US) LLP (57) ABSTRACT

The invention concerns a method for controlling the integrity of the value of a piece of navigation information delivered by a merging/consolidation device including a plurality of processing modules. Each module generates a navigation solution from measurements coming from one or a plurality of separate navigation devices, which involves defining, for each processing module, a radius of protection, corresponding to a given probability of failure. The method includes defining at least one consolidated area that encompasses protection areas centered on the solution values that are output from the processing modules and that correspond to the radii of protection defined for these modules. The radius of protection of the merging/consolidation device for the probability of failure itself is defined to correspond to the consolidated area.

13 Claims, 5 Drawing Sheets

(51) Int. Cl.
*G01C 21/00* (2006.01)
*G01C 21/16* (2006.01)

(58) Field of Classification Search
USPC .......................................................... 701/468
See application file for complete search history.

(56) References Cited

OTHER PUBLICATIONS

French Search Report and Written Opinion, dated Mar. 26, 2014, French Application No. 1300917.

|   | ① | ② | ③ | ④ | ⑤ | ⑥ |
|---|---|---|---|---|---|---|
| ① |   | C | E | E | E | E |
| ② |   |   | E | E | E | E |
| ③ |   |   |   | C | C | C |
| ④ |   |   |   |   | C | C |
| ⑤ |   |   |   |   |   | C |
| ⑥ |   |   |   |   |   |   |

FIG. 3b

|   | ① | ② | ③ | ④ | ⑤ | ⑥ |
|---|---|---|---|---|---|---|
| ① |   | C | E | E | C | C |
| ② |   |   | E | E | C | C |
| ③ |   |   |   | C | E | E |
| ④ |   |   |   |   | E | E |
| ⑤ |   |   |   |   |   | C |
| ⑥ |   |   |   |   |   |   |

FIG. 3c

|   | ① | ② | ③ | ④ | ⑤ | ⑥ |
|---|---|---|---|---|---|---|
| ① |   | C | C | C | E | E |
| ② |   |   | C | C | E | E |
| ③ |   |   |   | C | E | E |
| ④ |   |   |   |   | E | E |
| ⑤ |   |   |   |   |   | C |
| ⑥ |   |   |   |   |   |   |

FIG. 3d

|   | ① | ② | ③ | ④ | ⑤ | ⑥ |
|---|---|---|---|---|---|---|
| ① |   | E | C | E | C | C |
| ② |   |   | E | C | E | C |
| ③ |   |   |   | E | C |   |
| ④ |   |   |   |   | E | C |
| ⑤ |   |   |   |   |   | E |
| ⑥ |   |   |   |   |   |   |

FIG. 3e

|   | ① | ② | ③ | ④ | ⑤ | ⑥ |
|---|---|---|---|---|---|---|
| ① |   | C | C | C | C | C |
| ② |   |   | C | C | C | C |
| ③ |   |   |   | C | C | C |
| ④ |   |   |   |   | C | C |
| ⑤ |   |   |   |   |   | C |
| ⑥ |   |   |   |   |   |   |

INTEGRITY CONTROL METHOD AND MERGING/CONSOLIDATION DEVICE COMPRISING A PLURALITY OF PROCESSING MODULES

The present invention relates to integrity control in navigation systems.

It more particularly relates to a method and device for integrity control for processing modules using inertial measurements from an inertial measurement unit (also called IMU in the following text) as well as measurements from signals of constellations of radio-navigation satellites. In the subsequent text, these measurements will be called measurements from a navigation device.

It is also applicable to measurement information exclusively from signals of constellations of radio-navigation satellites.

GENERAL TECHNICAL FIELD

It is conventional to use for the navigation notably of aircraft or further ships, hybrid INS/GNSS ("Inertial Navigation System" and "Global Navigation Satellite System") equipment.

A piece of inertial equipment, using the information from an IMU for calculating localization, speed and orientation information, provides information with not very much noise and accurate in the short term. However, in the long term, the performances in localization of this piece of inertial equipment degrade (more or less rapidly depending on the quality of the sensors, accelerometers or gyroscopes for example, and of the achieved processing operations). If the pieces of information from a satellite radio-navigation system as for them are much less likely to drift over the long term, they are however often noisy and with variable accuracy. Moreover, inertial measurements are always available while GNSS information is not and are likely to be checked out and scrambled.

The INS/GNSS hybridization combines the information provided by IMU and the measurements provided by one or several satellite radio-navigation receivers optionally operating on different constellations in order to obtain position and speed information benefiting from both sources. The accuracy of the measurements provided by the GNSS receiver(s) allows control of the inertial drift and the not very noisy inertial measurements give the possibility of filtering out the noise on the measurements of the receiver.

Modern aeronautical navigation systems calculate a protection radius around the provided position which limits the true position error to a given risk of integrity. It is this pair consisting of a protection radius and of the associated integrity level which defines the integrity of the provided position.

This approach is also valid for variables other than the position on the ground (latitude, longitude) and notably for one-dimensional information like the altitude, for which protection distances are also calculated conventionally.

PRESENTATION OF THE INVENTION

An object of the invention is to propose a method for integrity control of information which determines protection radii taking into account particularly rare events or failures, for example having an occurrence likelihood per operating hour of less than $10^{-7}$. In this case, it becomes necessary to take into account events which have appearance probabilities per operating hour which are usually neglected.

As an example of very rare events potentially affecting the position or speed information may be mention the non-indicated double failure of radio-navigation satellites, non-indicated double failure of an IMU or further the non-indicated overall failure of a radio-navigation system, for which the occurrence level is of the order of $10^{-8}$/fh in the case of the GPS Naystar radio-navigation system.

For this purpose, a method for controlling the integrity of the value of a piece of navigation information delivered by a merging-consolidation device is proposed, comprising a plurality of processing modules each elaborating a navigation solution from measurements from one or several independent navigation devices, according to which a protection radius corresponding to a given failure probability is determined for each processing module, characterized in that at least one consolidated area which encompasses protection areas which are centered on the solution values at the output of the processing modules and which correspond to the determined protection radii for these modules is determined, the protection radius of said merging-consolidation device for said failure probability being itself determined for corresponding to said consolidated area.

In the case of measurement information exclusively stemming from a radio-navigation system, the processing module for example carries out the position autonomous integrity processing operation, achieved by the receiver (known under the acronym of P-RAIM) and its equivalent for the speed (V-RAIM) for calculating the associated values of protection radii. In the case of information from an IMU or GNSS, the processing module for example carries out hybridization and an integrity processing operation of the AAIM type.

Such a method is advantageously completed with the different following features taken alone or according to all their possible combinations:

when the measurements of at least one navigation device are used at the input of two processing modules, the other navigation devices for which the measurements are used at the input respectively of either one of these two processing modules are selected so as to be independent as regards their possible failure;

when at least two navigation devices are dependent as regards their possible failure, at least two processing modules which use the measurements of respectively either one of these navigation devices are such that the other navigation devices which they use at the input are independent as regards their possible failure;

after determining a consolidated circle centre, the radius of said consolidated circle is determined as being the one of a circle encompassing, the circles centered on the solution values at the output of the processing modules and for which the radii are equal to the protection radii of the latter;

the encompassing circle is the circle with a minimum radius encompassing the circle cantered on the solution values at the output of the processing modules;

the centre of the consolidated circle is determined as being equal to the average, if necessary a weighted average, of the solution values at the output of the different processing modules;

processing modules for detecting and excluding possible failures are applied at the output;

modules for processing consistency tests are applied on the outputs, according to which possible failures are detected;

the outputs of the consistency tests are analyzed for detecting on the data corresponding to these outputs characteristic signatures of certain failures;

the navigation devices common to a processing module are IMUs as well as radio-navigation receivers, and wherein a processing operation applied on the outputs of the processing modules or on the measurements at the input of the latter detects the failure of one or several satellite(s) and/or of an inertial measurement unit and/or a GNSS system and/or a GNSS receiver and/or an IMU type;

detection of an IMU hardware failure is applied at the processing modules.

A merging-consolidation device is also proposed, comprising a plurality of processing modules each elaborating a hybrid navigation solution from measurements stemming from one or several independent navigation devices, said merging-consolidation device including processing means which determine for each processing module a protection radius, corresponding to a given failure probability, characterized in that it includes a consolidation module which determines at least one consolidated area which encompasses protection areas which are centered on the solution values at the output of the processing modules and which correspond to the determined protection radii for these modules, the protection radius of said merging-consolidation device for said failure probability being itself determined in order to correspond to said consolidated area.

PRESENTATION OF THE FIGURES

Other features and advantages of the invention will further become apparent from the description which follows, which is purely illustrative and non-limiting and should be read with reference to the appended drawings wherein.

DESCRIPTION OF ONE OR SEVERAL EMBODIMENTS AND MODES OF APPLICATION

Consolidation and Architecture Example

Figure 1:
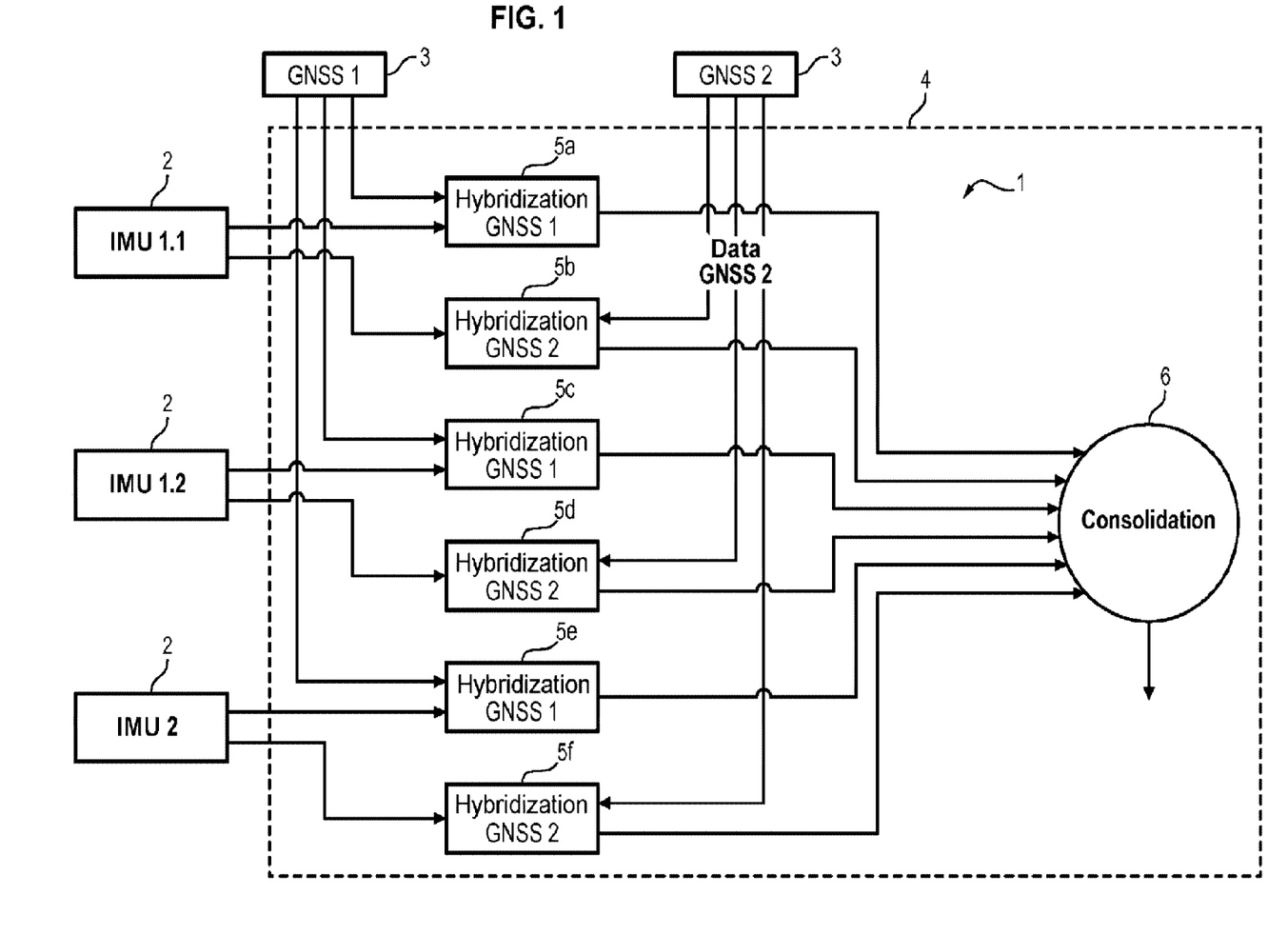
FIG. 1 illustrates an architecture of a merging-consolidation device associated with processing modules of the inertial/GNSS hybrid navigation type compliant with embodiment of the invention.

With reference to FIG. 1, a navigation system 1 is illustrated schematically, which is for example loaded onboard an aircraft or a ship (or intended to be loaded thereon).

This navigation system 1 uses various IMU and GNSS navigation devices and includes for this purpose, different inertial measurement units 2, as well as GNSS signal receivers 3 of different types of constellations. It further includes a merging-consolidation device 4 (a computing platform) which includes six processing modules 5a to 5f of the type with Kalman filters on the one hand and a consolidation module 6 on the other hand.

More particularly, in the illustrated example, three inertial measurement units 2 IMU1.1, IMU1.2 and IMU2 are provided, the first two being of the same type (type 1), the third one as for it being another type (type 2). The receivers 3 allow pseudo-measurements on at least two satellite constellations, one GNSS 1 for example being a GPS constellation, the other one GNSS 2 for example being a GALILEO or GLONASS constellation.

Each processing module 5a to 5f receives:
data at the output of a unit 2, inertial increment measurements achieved by the sensors (gyroscopes, accelerometers) of the unit
and data of pseudo-measurements at the output of a receiver 3.

Notably, the module 5a receives both GNSS1 data and data of the IMU1.1 unit, the module 5b, GNSS2 data and data of the IMU1.1 unit, module 5c, GNSS1 data and data of the IMU1.2 unit, module 5d, GNSS2 data and data of the IMU1.2 unit, module 5e, GNSS1 data and data of the IMU2 unit, module 5f, finally, receiving GNSS2 data and data of the IMU2 unit (see table below).

|  | GNSS 1 | GNSS2 |
|---|---|---|
| IMU 1.1 | (5a) HYB IMU 1.1 + GNSS1 | (5b) HYB IMU 1.1 + GNSS2 |
| IMU 1.2 | (5c) HYB IMU 1.2 + GNSS1 | (5d) HYB IMU 1.2 + GNSS2 |
| IMU 2 | (5e) HYB IMU 2 + GNSS1 | (5f) HYB IMU 2 + GNSS2 |

The applied at the processing modules 5a to 5f may be of any known type, for example of the AAIM type. Protection radii for the given failure probabilities are computed by the processing modules 5a to 5f within the scope of applying these algorithms.

For detailed examples for calculating protection radii achieved as a processing module, reference may advantageously be made to patent application EP2374022 (A1) filed by the applicant and entitled "Dispositif d'hybridation en boucle fermée intègre par construction" (Integrated closed-loop hybridization device built in by construction).

Figure 2:
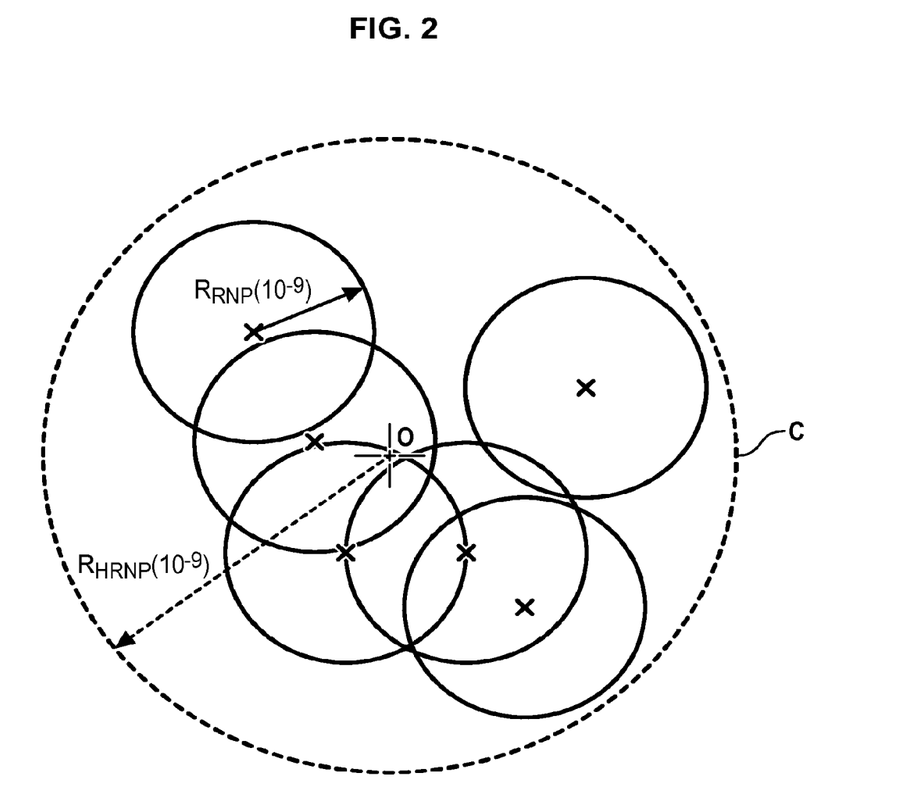
FIG. 2 schematically illustrates a possible embodiment of the invention.

The consolidation applied by the consolidation module 6 determines for each processing module 5a to 5f, a circle for which the radius is equal to the protection radius of said module for the sought failure probability and the centre of which is the value of the solution provided at the output of the processing by said module (circles in solid lines in FIG. 2).

In the illustrated example, six processing modules are made and thus six circles are available.

The module 6 further determines from these six circles, an encompassing circle (circle in dotted lines). Different determination methodologies may be used.

The centre O of the consolidated circle is determined according to the values at the output of the various processing modules 5a to 5f. For example, the centre O of this circle may be selected to be the average, if necessary weighted average, of the values of solutions at the output of the processing modules 5a to 5f.

Once this centre O has been selected, the retained circle C may then be selected as the circle encompassing a minimum radius, or any other encompassing circle.

The radius R of this circle C is then used as a protection radius, for the protection probability. It will be noted that the variable for which a protection radius is thereby determined may be a two-dimensional ground position or speed information or further a one-dimensional piece of information, such as for example altitude or azimuth speed.

The protection radius corresponds to a maximum error for a given error occurrence probability.

Illustration of an Embodiment

Definitions

In the continuation of the text, the restrictive condition (or assumption) "RNP" (for Rare Normal Performance) is defined as the possible presence of failures or simple or combined events at an IMU, of a GNSS receiver or of a constellation or further of a combination of failures at these various elements which may occur with a probability per hour of flight of more than $10^{-7}$/fh.

The restrictive condition (or assumption) "HRNP" (for hyper rare normal performance) is defined as the possible presence of failures or events at an IMU, a GNSS receiver or a constellation or further a combination of failures at these different elements which may occur with a flight hour probability of less than $10^{-7}$/fh and greater than $10^{-9}$/fh. Among the failures taken into account in HRNP but not in RNP, appear:

Two non-indicated satellite failures on a "HRNP GNSS1" or "HRNP GNSS2" constellation, A non-indicated overall failure of a constellation or a non-indicated failure of a "HRNP GNSS1" or "HRNP GNSS2" receiver, IMU common modes of type 1 (simultaneous failure on IMU1.1 and IMU1.2) "HRNP IMU T1"

a non-indicated simultaneous failure of two IMUs of different type "HRNP IMU T1 T2", an "abnormal" error towards the indicated error budget (of a pseudo distance, of a pseudo speed, of a delta range) assumably emitted with a normal (i.e. Gaussienne) distribution.

Assumptions

According to the DO-229D standard for failures acting on pseudo-distances GPS NAVSTAR, it is considered that events like a triple satellite failure or a constellation and IMU simultaneous failure have probabilities of occurrence per flight hour which are negligible towards $10^{-9}$/fh.

The data from constellations are assumed to be independent (independent antennas, independent receivers, independent GNSS systems . . . )

Each of the processing operations (modules 5a to 5f) is capable of providing a position and a horizontal speed with a protection radius at $10^{-9}$f/h (without taking into account events at IMUs and constellations which may occur between $10^{-7}$ and $10^{-9}$/fh).

A suitable example of a processing module is hybridization as described in patent application FR2939900.

For each processing module, a protection radius at $10^{-7}$/fh with the restrictive assumption RNP (a radius noted as "$R_{RNP}(10^{-7})$") is elaborated.

For each processing module, the protection radius is then calculated at $10^{-9}$ f/h with the restrictive assumption RNP (radius noted as "$R_{RNP}(\mathbf{10^{-9}})$").

This protection radius "$R_{RNP}(10^{-9})$" is extrapolated for this purpose by assuming distribution of the 2D Gaussian law between the probabilities $10^{-7}$ and $10^{-9}$.

Thus, at the output of each processing module 5a to 5f, a value of the protection radius $R_{RNP}(10^{-9})$ is obtained (in speed like in horizontal position) at $10^{-9}$/fh with the restrictive assumption RNP.

Consolidation

The consolidation of the outputs of the processing modules 5a to 5f applied at the module 6 determines a consolidated protection radius for the merging-consolidation device 4. This determination is carried in the described way above, with reference to FIGS. 1 and 2, by calculating a circle which encompasses the whole of the deemed to be valid, i.e. included in discs of radius $R_{RNP}(10^{-9})$ at the output of the processing modules, for the selected consolidated 2D value (speed or position).

Thus, the module 6 provides a horizontal position (like a speed) and the protection radius "$R_{HRNP}(10^{-9})$" at $10^{-9}$/fh without the restrictive assumption RNP, but neglecting simple or combined failures with occurrence probabilities of less than $10^{-9}$/fh.

Analysis of the Behavior in the Case of "Very Rare" Failures

In order to illustrate the possible consolidation operations, the cases having an occurrence probability between $10^{-7}$/fh and $10^{-9}$/fh i.e. HRNP and RNP are analyzed by filling the cells of table 1 below in the following way:

with "OK" if the entries of the processing module observe the assumption RNP with "KO" if the entries of a processing module does not observe the assumption RNP while observing the assumption HRNP.

This table changes according to the assumption on the operating conditions.

Under the assumption RNP, one has the following table:

| RNP and $\overline{\text{HRNP}}$ | GNSS 1 | GNSS2 |
|---|---|---|
| IMU 1.1 | OK | OK |
| IMU 1.2 | OK | OK |
| IMU 2 | OK | OK |

Under the assumption HRNP and $\overline{\text{RNP}}$, in the case of a locally undetected failure of the GNSS1 system such as for example two faulty satellites, an overall constellation failure, or a failure at the receiver, one has the following table:

| HRNP/GNSS1 | GNSS 1 | GNSS2 |
|---|---|---|
| IMU 1.1 | KO | OK |
| IMU 1.2 | KO | OK |
| IMU 2 | KO | OK |

Under the assumption HRNP and $\overline{\text{RNP}}$, in the case of an undetected failure (locally) of the GNSS2 system such as for example two faulty satellites, an overall constellation failure, or a failure at the receiver, one has the following table:

| HRNP/GNSS2 | GNSS1 | GNSS 2 |
|---|---|---|
| IMU 1.1 | OK | KO |
| IMU 1.2 | OK | KO |
| IMU 2 | OK | KO |

Under the assumption HRNP and $\overline{\text{RNP}}$, in the case of HRNP IMU T1, one has the following table:

| HRNP/IMU T1 | GNSS1 | GNSS 2 |
|---|---|---|
| IMU 1.1 | KO | KO |
| IMU 1.2 | KO | KO |
| IMU 2 | OK | OK |

Under the assumption HRNP and $\overline{\text{RNP}}$, in the case of HRNP IMU T1 or (and) T2 one has the two following tables:

| HRNP/IMU T1.1-T2 | GNSS1 | GNSS 2 |
|---|---|---|
| IMU 1.1 | KO | KO |
| IMU 1.2 | OK | OK |
| IMU 2 | KO | KO |

Or:

| HRNP/IMU T1.2-T2 | GNSS1 | GNSS 2 |
|---|---|---|
| IMU 1.1 | OK | OK |
| IMU 1.2 | KO | KO |
| IMU 2 | KO | KO |

Thus, on the whole of the 6 available processing modules, with radii at $10^{-9}$/fh computed under the assumption RNP, at least two modules (not necessarily identified) are "intact" since they observe the assumptions related to the provided protection radii.

The true horizontal position, like the true horizontal speed, therefore has a probability per flight hour of less than $10^{-9}$/fh of being outside each of the two protection circles provided by these two (at the very least) processing modules, each circle being centered on the provided solution.

Therefore the probability per flight hour that the true position (or the speed) (in a point of the craft common to the computations of the modules) is outside any circle encompassing these six circles is less than $10^{-9}$ including in the very rare case of failure HRNP and $\overline{RNP}$.

Detection of Failures, Possible Exclusions and Maintenance

The applied consolidation may be completed with a processing operation allowing detection of certain failure modes and their automatic management by provisional or definitive exclusion for the mission period of optimum navigations detected to be faulty.

For this purpose for example, an FDE (fault detection and exclusion) algorithm is applied at the module 6 between the outputs of the six processing modules. This algorithm detects and optionally isolates a non-indicated failure HRNP but $\overline{RNP}$. It is further completed by sub-processing operations applied at each processing module 5a to 5f for detecting possible failures at the hardware sub-assembly (IMU, computer, GNSS receiver).

The tables above show that rare HRNP failures but $\overline{RNP}$ failures have particular signatures: for example a GNSS1 failure will impact all the processing modules making use of GNSS1 and not the others.

The FDE processing of the 6 modules makes use of these signatures for detecting and isolating the effect of failures.

For this purpose, it for example applies over the whole of the results, the tests between the following valid solutions:
The HYB X and HYB Y outputs of two processing modules 5a to 5f are "RNP consistent" (respectively RNP "non-consistent") if at least one point is common to the whole of the solutions at $10^{-9}$ RNP emitted by each module. This amounts to testing whether the standard 2 between both outputs exceeds or not the sum of both protection radii plus the effect of the asynchronisms between these outputs.
The HYB X and HYB Y outputs are "RNP excluded" (respectively RNP "non-excluded") if the standard 2 between both solutions exceeds k times, k greater than or equal to 1, the sum of the two protection radii plus for example the effect of the asynchronisms between these outputs.

It will be noted that both of these tests do not switch at the same time.

The tests above are then used for determining characteristic signatures of certain failure modes.

The signatures of different types of failures are illustrated in the tables of FIGS. 3a to 3e.

The lines and columns 1 to 6 respectively correspond to the outputs of the modules 5a to 5f.

The boxes marked as C correspond to RNP consistency cases, while those marked as E correspond to RNP exclusions.

The response of table 3a is typical of an IMU1.1 failure, that of table 3b of an IMU1.2 failure, that of table 3c of an IMU2 failure or a general failure of the IMUs of type 1 and table 3d finally of a GNSS1 or GNSS2 type of failure or further two satellite failures (GNSS1 or GNSS2).

Figure 3A:
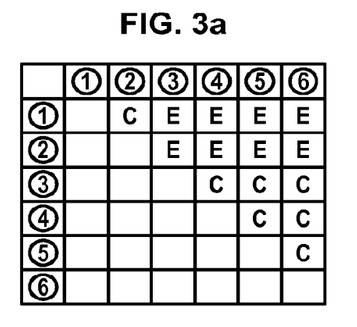
FIGS. 3a to 3e illustrate different examples of characteristic signatures of failure modes which may be detected in a mode for applying the invention.
Figure 3B:
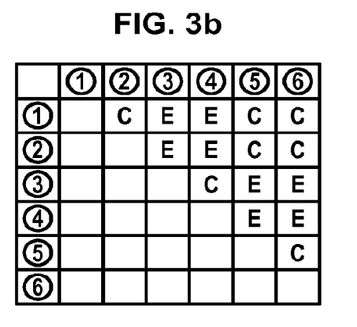
Figure 3C:
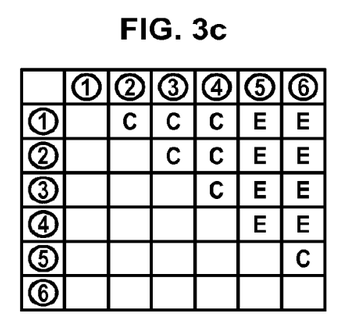
Figure 3D:
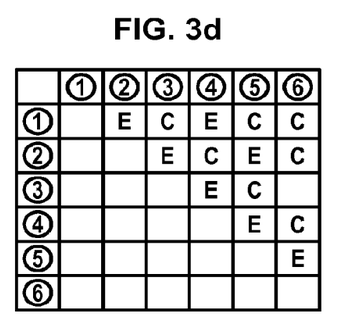
Figure 3E:
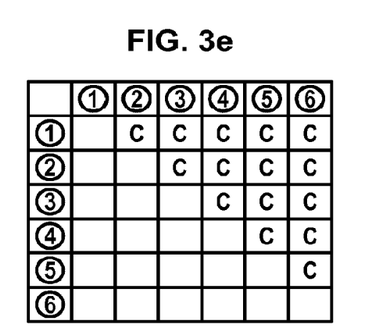

FIG. 3e as for it is typical of the case when there is no failure or a single satellite failure.

Once the characteristic signature is determined and detected by the consolidation module 6, the latter may depending on the case choose to isolate the faulty navigation solutions (cases of signatures corresponding to an IMU1.1 or IMU1.2 failure, for example) or further launch additional tests or be subject to imposed directives.

In what has just been described, several FDE processing operations are applied in cascade between the processing modules 5a to 5f and the module 6. Other alternatives wherein the FDE processing is applied on the whole of the measurements provided at the input of the different processing modules 5a to 5f by the GNSS systems and the IMUs may of course also be contemplated.

Behavior in the Case of a "Coasting" Operation

The "coasting" operation (on the basis of the single IMUs used for integrating a navigation in the absence of hybridizations) on the whole or on some of the processing modules naturally occurs for example when
one of the two GNSS1 or GNSS2 systems is unavailable, a receiver is faulty
the used frequency band is scrambled beyond the capabilities of the receiver,
the geometrical configuration and the number of connected satellites are insufficient for validating via P-RAIM (and V-RAIM if the hybridization in a "delta range" or speed) the receiver measurements.

In this type of operation:
the hybrid navigation outputs (the "HYB" outputs of the modules 5a to 5f), which are given and the protection radius, change consistently depending on the movements.
the consolidated values (horizontal position or speed and associated RHRNP($10^{-9}$)) thereby elaborated remain valid.

Other Application Configurations or Achieved Configurations

Figure 4:
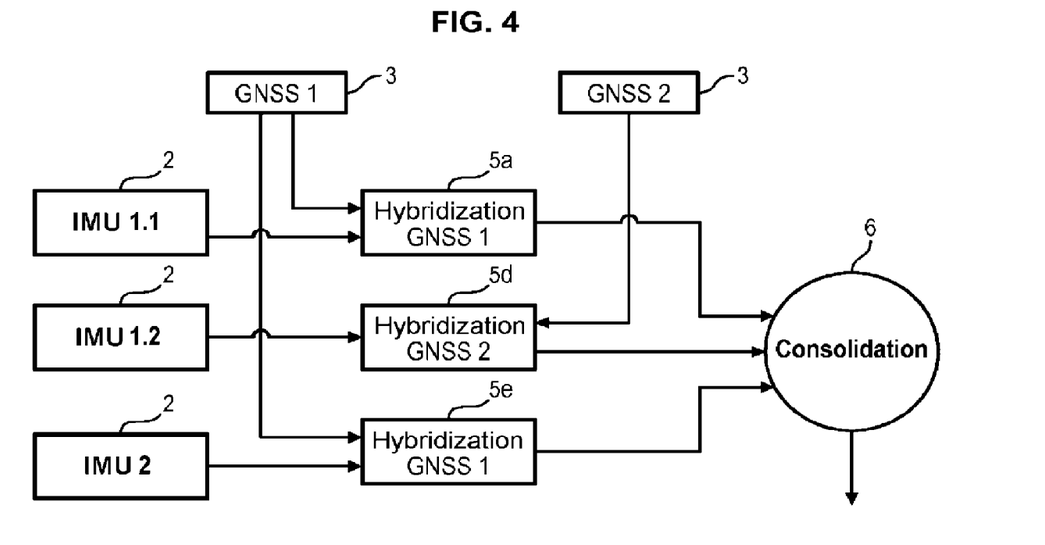
FIGS. 4, 5 and 6 illustrate possible consolidation architecture examples for a navigation device according to an embodiment of the invention.

FIG. 4 illustrates another possible merging-consolidation architecture.

Notably, in the application mode illustrated in FIG. 4, only the processing modules 5a, 5d and 5e are retained.

With such an architecture, the GNSS1 radio-navigation measurements are used both at the input of the processing modules 5a and 5e, but the other inputs of either one of these two modules are totally independent as to their possible failure, since these are measurements from IMU1.1 and from IMU2 which are of two independent types.

Also, the modules 5a and 5d receive at the input measurements from two navigation devices which are not independent as to their possible failure, since they are of the same type (IMU1.1 and IMU1.2). However, the other inputs of both of these modules as for them stem from the independent navigation devices (in this case GNSS1 and GNSS2) as to their possible failure.

This architecture has the advantage of giving the possibility of ensuring the same integrity of the consolidated measurements with the same probability as that of each of the processing modules, and this with a total computation load divided by two with respect to the architecture of FIG. 1. It therefore requires less computation capacity.

Figure 5:
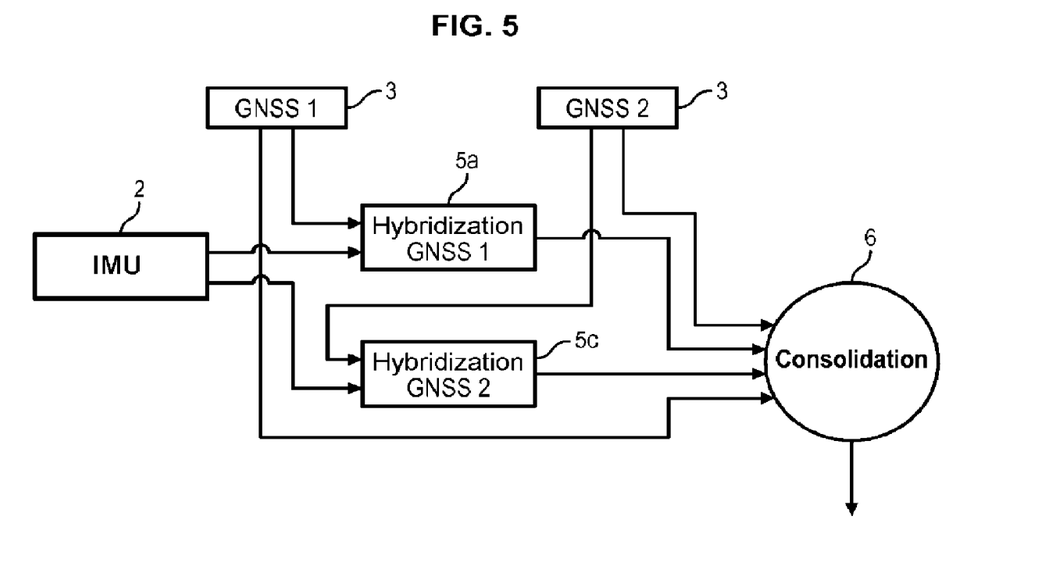

FIG. 5 illustrates another possible merging-consolidation architecture, wherein only the processing modules 5a and 5c are retained.

With such an architecture, the GNSS1 radio-navigation measurements are used at the input of the processing module 5a, the GNSS2 radio-navigation measurements are used at the input of the processing module 5c.

Also, the modules 5a and 5c receive as input measurements from two navigation devices which are not independent as to their possible failure, since they are of the same type (IMU1.1 and IMU1.2). However, the other inputs of both of these modules as for them stem from independent radio-navigation devices (in this case GNSS1 and GNSS2) as to their possible failure.

This architecture unlike those shown in FIG. 1 and FIG. 4 does not require navigation devices of different types. It is therefore simpler to produce than the architectures shown in FIGS. 1 and 4.

Figure 6:
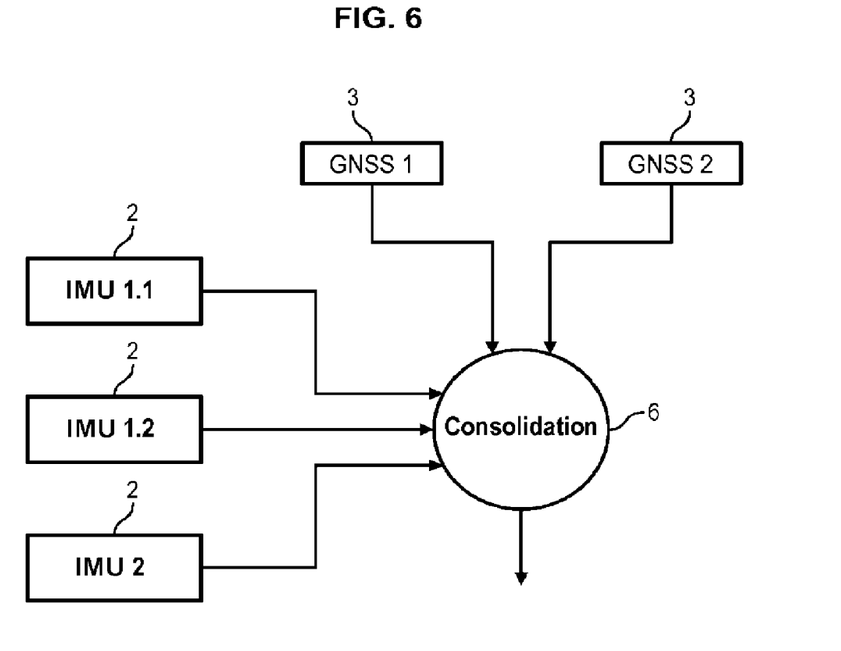

FIG. 6 illustrates another possible merging-consolidation architecture wherein the processing modules are suppressed and the merging-consolidation module uses the measurements which stem from the independent GNSS1 and GNSS2 radio-navigation devices as to their possible failure.

More generally, the proposed method applies to all navigation systems making use of navigation devices having different failure assumptions.

What is claimed is:

1. A method for delivering navigation information and for controlling the integrity of said navigation information, comprising:
    obtaining measurements from one or a plurality of independent navigation devices including inertial measurement units (IMUs) and radio-navigation receivers,
    receiving said measurements data from said IMUs and radio-navigation receivers,
    at least one processor combining and processing said received measurements to provide a plurality of hybrid navigation solutions with each navigation solution being generated from received measurements data from a different set of IMU s and radio-navigation receivers,
    determining a protection radius with respect to a given failure probability for each of said navigation solutions,
    processing said hybrid navigation solutions to provide a consolidated navigation information,
    wherein, for the integrity control of the consolidated navigation information, the method further comprises said at least one processor
    determining at least one consolidated area which encompasses protection areas which are centered on the navigation solution values and which correspond to the protection radii determined for said hybrid navigation solutions,
    determining a radius for said consolidated area, and
    outputting said radius as the protection radius with respect to said given failure probability for the consolidated navigation information.

2. The method according to claim 1, wherein when the measurements of at least one navigation device are used for two different sets of measurements, the other navigation devices from which the measurements are respectively of either one of both of these sets of measurements are selected so as to be independent as to their possible failure.

3. The method according to claim 1, wherein when at least two navigation devices are dependent as to their possible failure, at least two sets of navigation devices which use the measurements respectively of either one of these navigation devices are such that the other navigation devices are independent as to their possible failure.

4. The method according to claim 1, wherein, after determining a consolidated circle centre, the radius of said consolidated circle is determined as being that of a circle encompassing, the circles centered on the solution values and for which the radii are equal to the protection radii of the latter.

5. The method according to claim 4, wherein the encompassing circle is the circle of minimum radius encompassing the circles centered on the solution values.

6. The method according to claim 5, wherein the consolidated circle centre is determined as being equal to the average, if necessary weighted average, of the solution values.

7. The method according to claim 1, wherein detection and exclusion of possible failures are applied.

8. The method according to claim 7, wherein consistency tests according to which possible failures are detected are applied on the navigations solutions.

9. The method according to claim 7, according to which the outputs of the consistency tests are analyzed for detecting on the data corresponding to these outputs, characteristic signatures of certain failures.

10. The method according to claim 1, wherein the navigation devices common to a processing module are IMUs as well as radio-navigation receivers, and wherein a processing operation applied on the navigation solutions or on the measurements at the input of the latter detects the failure of one or several satellite(s) and/or of an inertial measurement unit and/or of a GNSS system and/or of a GNSS receiver and/or of an IMU type.

11. The method according to claim 10, according to which, a detection of a failure of IMU hardware is applied at the navigation solutions.

12. A merging-consolidation device comprising a plurality of processing modules each providing a hybrid navigation solution from measurements obtained from one or several independent navigation devices being either IMUs or radio-navigation receivers, said merging-consolidation device including a processor which determine for each processing module, a protection radius with respect to a given failure probability, wherein the merging-consolidation device further includes a consolidation module processing said navigation solutions to provide a consolidated navigation information, which determines at least one consolidated area which encompasses protection areas being centered on the navigation solution values at the output of the processing modules and corresponding to the determined protection radii for said processing modules, and which determines the protection radius of said merging-consolidation device with respect to said failure probability corresponding to said consolidated area.

13. A method for delivering navigation information and for controlling the integrity of said navigation information, comprising:

obtaining measurements from one or a plurality of independent navigation devices including inertial measurement units(IMUs) and radio-navigation receivers, receiving said measurements data from said IMUs and radio-navigation receivers, at least one processor combining and processing said received measurements to provide a plurality of hybrid navigation solutions with each navigation solution being generated from received measurements data from a different set of IMUs and radio-navigation receivers, and determining a protection radius with respect to a given failure probability being determined for each of said navigation solutions, processing said hybrid navigation solutions to provide a consolidated navigation information, wherein, for the integrity control of the consolidated navigation information, the method further comprises said at least one processor determining at least one consolidated area which encompasses protection areas which are centered on the navigation solution values and which correspond to the protection radii determined for said hybrid navigation solutions, determining a radius for said consolidated area, and outputting said radius as the protection radius with respect to said given failure probability for the consolidated navigation information, wherein when the measurements of at least one navigation device are used for two different sets of measurements, the other navigation devices from which the measurements are respectively of either one of both of these sets of measurements are selected so as to be independent as to their possible failure;

when at least two navigation devices are dependent as to their possible failure, at least two sets of navigation devices which use the measurements respectively of either one of these navigation devices are such that the other navigation devices are independent as to their possible failure; and after determining a consolidated circle centre, the radius of said consolidated circle is determined as being that of a circle encompassing, the circles centered on the solution values and for which the radii are equal to the protection radii of the latter.

\* \* \* \* \*